US008622100B2

(12) United States Patent
Levy et al.

(10) Patent No.: US 8,622,100 B2
(45) Date of Patent: Jan. 7, 2014

(54) OIL COLLECTION ASSEMBLY

(75) Inventors: Gordon Levy, Golden, CO (US);
Yen-Iun Lai, Denver, CO (US); Ming Shan, Thornton, CO (US)

(73) Assignee: Navajo Manufacturing Company, Inc., Denver, CO (US)

( * ) Notice: Subject to any disclaimer, the term of this patent is extended or adjusted under 35 U.S.C. 154(b) by 470 days.

(21) Appl. No.: 12/926,904

(22) Filed: Dec. 16, 2010

(65) Prior Publication Data
US 2012/0152408 A1    Jun. 21, 2012

(51) Int. Cl.
*B67C 11/00* (2006.01)

(52) U.S. Cl.
USPC ............................................. 141/87; 141/342

(58) Field of Classification Search
USPC ................. 141/85–88, 331–332, 340–342
See application file for complete search history.

(56) References Cited

U.S. PATENT DOCUMENTS

| RE16,842 | E | 1/1928 | Hampton | |
|---|---|---|---|---|
| 1,660,442 | A | 2/1928 | Hampton | |
| 3,899,012 | A | 8/1975 | Sather | 141/331 |
| 3,986,538 | A * | 10/1976 | Sather | 141/332 |
| 4,130,147 | A | 12/1978 | Langlie et al. | 141/98 |
| 4,600,125 | A | 7/1986 | Maynard, Jr. | 222/81 |
| 4,789,017 | A * | 12/1988 | Panasewicz et al. | 141/342 |
| 4,823,848 | A * | 4/1989 | Sentmore et al. | 141/334 |
| D340,731 | S | 10/1993 | Pollak et al. | D15/150 |
| 5,803,140 | A | 9/1998 | Jodoin | 141/332 |
| 5,967,201 | A * | 10/1999 | Gasior | 141/98 |
| 6,098,678 | A | 8/2000 | Shears | 141/331 |
| 6,154,891 | A * | 12/2000 | Wilson | 4/144.4 |
| 6,450,219 | B1 | 9/2002 | Ingram | 141/333 |
| 7,114,536 | B2 | 10/2006 | Guthrie | 141/337 |
| 7,246,639 | B2 | 7/2007 | Kuntz | 141/86 |
| 7,469,784 | B1 * | 12/2008 | Bower | 206/223 |
| 8,430,138 | B2 * | 4/2013 | McGeary | 141/337 |
| 2011/0214782 | A1 * | 9/2011 | McGeary | 141/337 |

FOREIGN PATENT DOCUMENTS

DE       19608998 A1 *  9/1997  ............ A47K 11/12

* cited by examiner

*Primary Examiner* — Gregory Huson
*Assistant Examiner* — Nicolas A Arnett
(74) *Attorney, Agent, or Firm* — Studebaker & Brackett PC

(57) ABSTRACT

A funnel and drain hose are interengaged in a specific orientation. The drain hose is positioned on the funnel with the opposed ends of the drain hose vertically positioned when the funnel is properly hung on a wall. The opposed ends of the drain hose face upwardly so that any residual oil trapped in the drain hose collects at the bottom of a U-shaped portion of the drain hose positioned on the funnel.

18 Claims, 4 Drawing Sheets

OIL COLLECTION ASSEMBLY

FIELD OF THE INVENTION

The present invention relates to the field of oil collection by the use of a funnel and a drain hose with the drain hose being mounted along a peripheral edge of the funnel when the funnel is hung on a wall.

BACKGROUND OF THE INVENTION

Many different mechanisms are known for catching oil drained from an oil pan of an automobile. Typically, a funnel having a large opening significantly greater than the size of the oil pan drain opening is positioned below the oil pan. When the oil drain plug is removed, oil is allowed to flow into the funnel. Positioned below the funnel is usually a storage container for capturing the used automobile oil.

This process is repeated until a significant quantity of used oil is captured, typically in a 55-gallon storage drum. The drum is then sealed and transported for recycling or alternative use of the captured oil. This process may be undertaken by an individual homeowner or a small auto repair shop.

Due to the lack of frequency of use when performed by a homeowner, the component parts for capturing used oil must be stored in the homeowner's garage or shop. It is desirous that the assembly for capturing used oil occupy a minimum amount of space and fully capture the oil, so as not to produce a spill.

SUMMARY OF THE INVENTION

This object is accomplished by the present invention. The present invention includes the assembly of a funnel and a drain hose for oil collection. The funnel and drain hose are interengaged in a specific orientation. The drain hose is positioned on the funnel with the opposed ends of the drain hose vertically positioned when the funnel is properly hung on a wall. The opposed ends of the drain hose face upwardly so that any residual oil trapped in the drain hose collects at the bottom of a U-shaped portion of the drain hose positioned on the funnel.

By hanging the funnel assembly on a wall, gravity is used to always maintain residual oil within the drain hose. Residual amounts of oil are thereby collected to avoid the spilling of any oil residue.

This object is accomplished by including a wall mount opening at one end of the funnel. At the opposite end of the funnel and along the sides of the funnel are positioned a series of retention brackets or clips into which the drain hose is engaged. The bracket or clips maintain the drain hose in a specific orientation, so as to collect residual amounts of oil contained in the drain hose. When the funnel is hung vertically on a wall, the drain hose is positioned with its opposite open ends extending vertically upwardly with its opposed openings elevated above the drain hose, so as to transition any residual or excess oil in the drain hose into a thus formed U-shaped portion of the drain hose. The excess oil has no place to escape to and is thereby contained within the drain hose.

Accordingly, it is another object of the present invention to interengage a drain hose and a funnel for collection of used automobile oil.

It is another object of the present invention to interengage a drain hose and a funnel for collection of used automobile oil with the funnel including an opening for mounting of the funnel on the wall in a specific orientation.

It is still yet another object of the present invention to interengage a drain hose and a funnel for collection of used automobile oil with the funnel including an opening for mounting of the funnel on the wall in a specific orientation and with the drain hose interengaged around a peripheral edge of the funnel so that opposite ends of the drain hose are oriented vertically and residual oil is collected in a U-shaped portion of the drain hose when the funnel is mounted vertically on a wall.

These and other objects of the invention, as well as many of the intended advantages thereof, will become more readily apparent when reference is made to the following description taken in conjunction with the accompanying drawings.

BRIEF DESCRIPTION OF THE DRAWINGS

The following drawings illustrate examples of various components of the invention disclosed herein, and are for illustrative purposes only. Other embodiments that are substantially similar can use other components that have a different appearance.

DETAILED DESCRIPTION OF THE PREFERRED EMBODIMENTS

Figure 1:
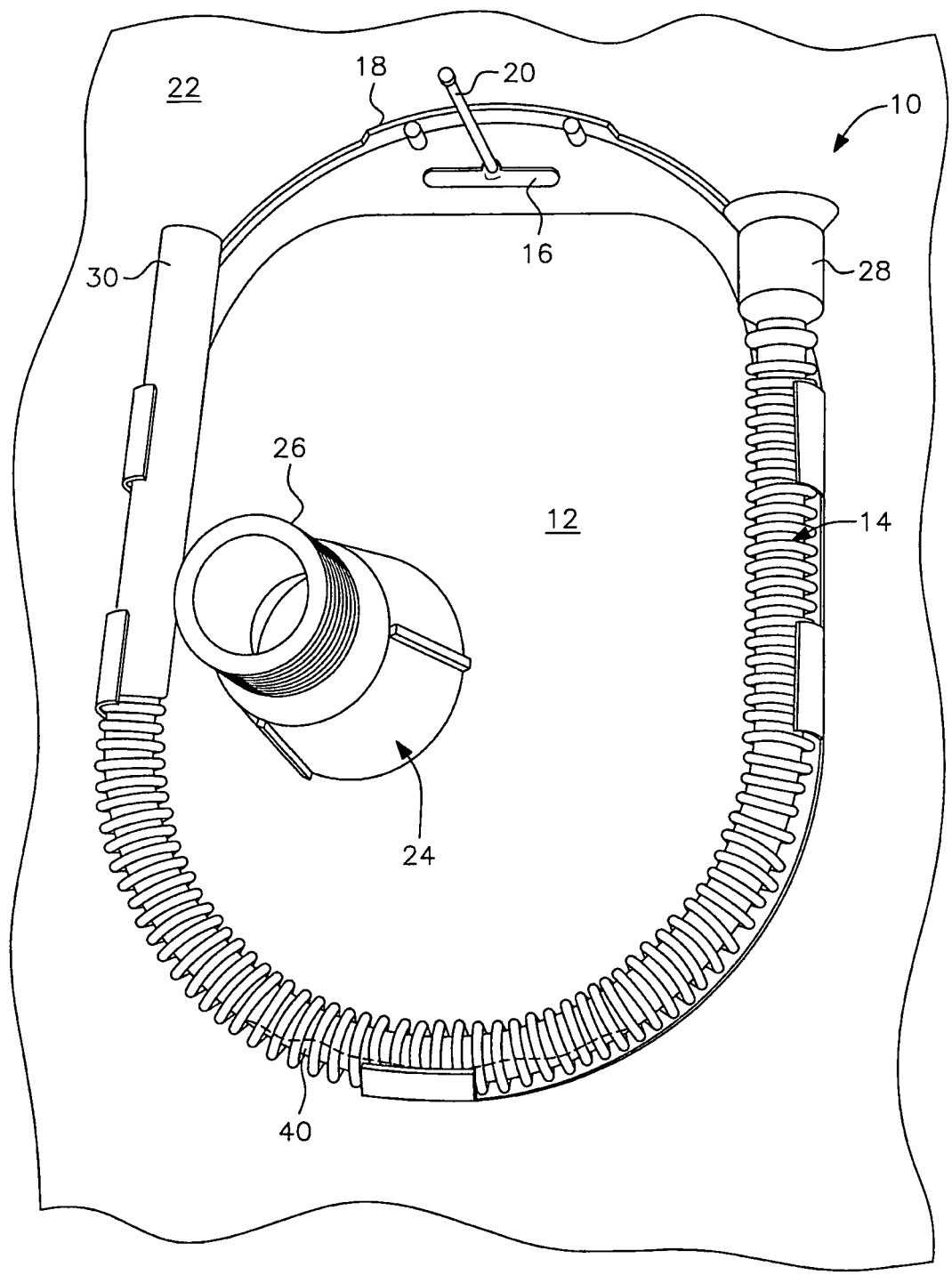
FIG. 1 is a perspective view of the interengaged oil collection assembly of the present invention mounted vertically on a wall.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
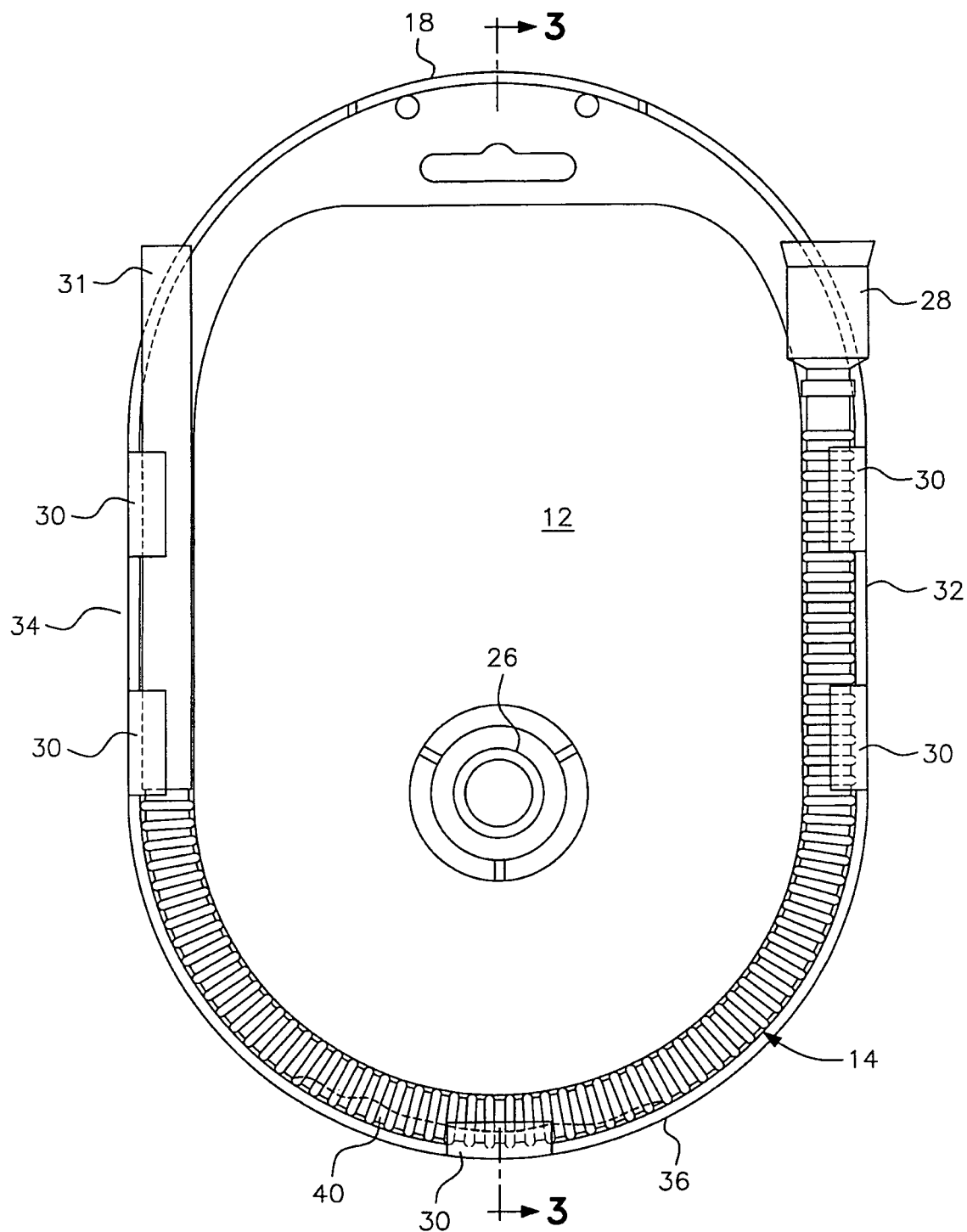
FIG. 2 is a rear view illustrating the interengagement of the drain hose on three sides of the peripheral edge of the funnel by a series of brackets or clips engaging the drain hose.

With reference to the drawings, in general, and to FIGS. 1 and 2, in particular, an oil drain collection assembly embodying the teachings of the subject invention is generally designated as 10. With reference to its orientation in FIG. 1, the oil drain collection assembly includes a funnel 12 and a drain hose 14. The funnel 12 includes an opening 16 mounted at an upper end 18 for mounting the funnel on a wall by passage of a peg 20 or other projection extending through the opening 16. The funnel thereby lies flat against the wall 22 as shown in FIG. 1.

The funnel 12 includes a drain spout 24 having an externally threaded outlet 26. The threaded outlet 26 is adapted to engage with an internally threaded end 28 of the drain hose 14. The opposite end 31 of the drain hose includes a spout for directing passage therethrough of oil from the funnel 12 to the spout 31 when the end 28 is connected to the threaded outlet 26 of the funnel.

As shown in FIG. 2, the funnel 12 includes two curved retention clips 30 along side wall 32. Similarly, two curved retention clips 30 extend from opposite side wall 34. At the bottom 36 of the funnel is a single centrally located clip 30. The clips 30 are generally of a peripheral curvature similar to a curvature of the drain hose 14. The clips are used to engage and retain the drain hose along the peripheral sides 32 and 34 and bottom 36 of the funnel.

When the internally threaded end 28 of the drain hose is removed from the threaded outlet 26 of the funnel, residual amounts of fluid or oil are retained within the drain hose. Over time, with the ends 28, 31 of the drain hose positioned in a substantially vertical orientation by the mounting of the drain hose on the funnel and hanging of the funnel 12 on a wall 22, residual oil 40 is allowed to collect in a U-shaped mid portion of the flexible drain hose 14. This oil is retained in position until the drain hose is removed from the funnel and the internally threaded end 28 is connected to the externally threaded outlet 26 of the funnel. The collected oil 40 is thereby directed by end 31 into a recycling or other container.

Figure 3:
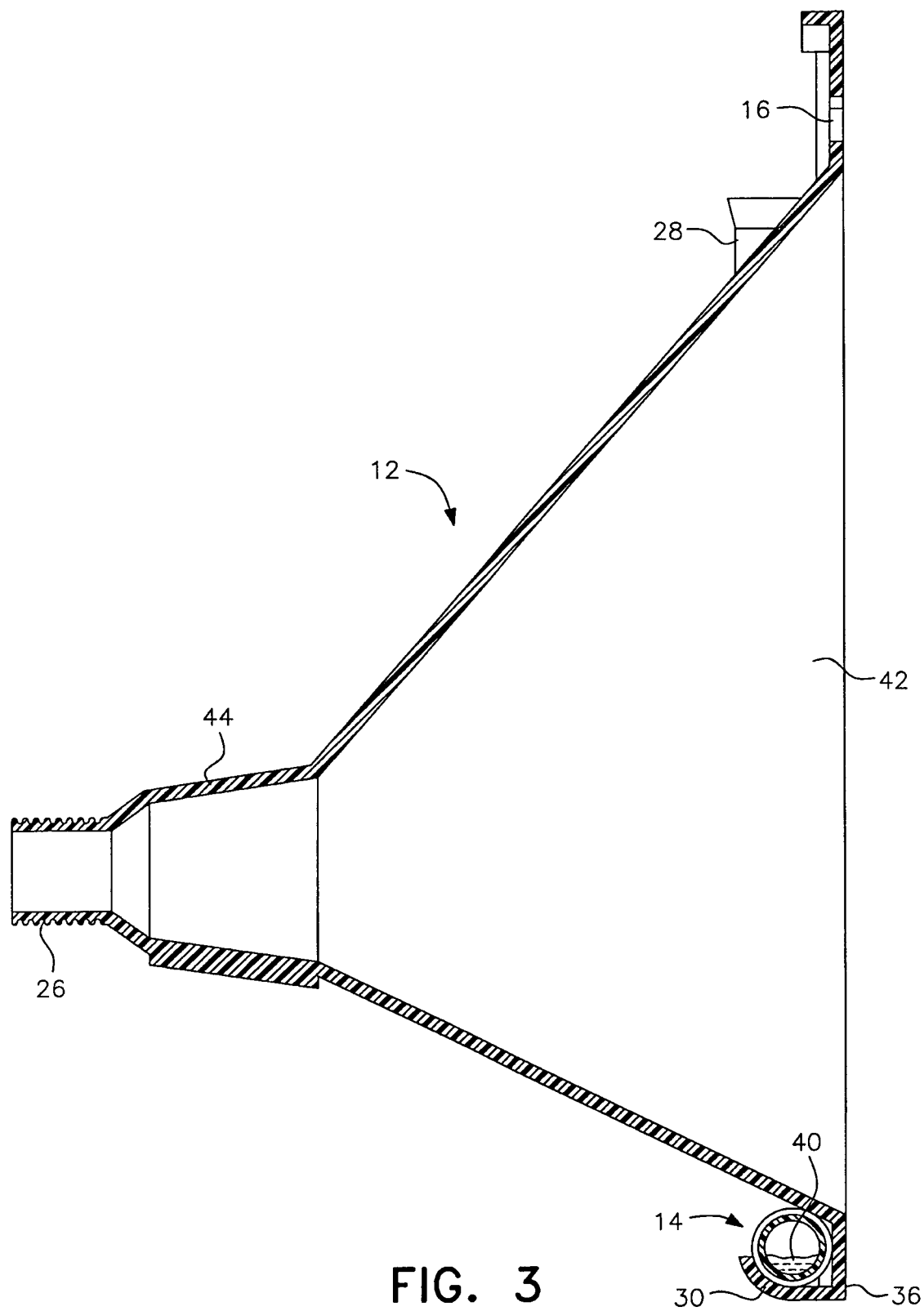
FIG. 3 is a cross sectional view taken along line 3-3 of FIG. 2.
Figure 4:
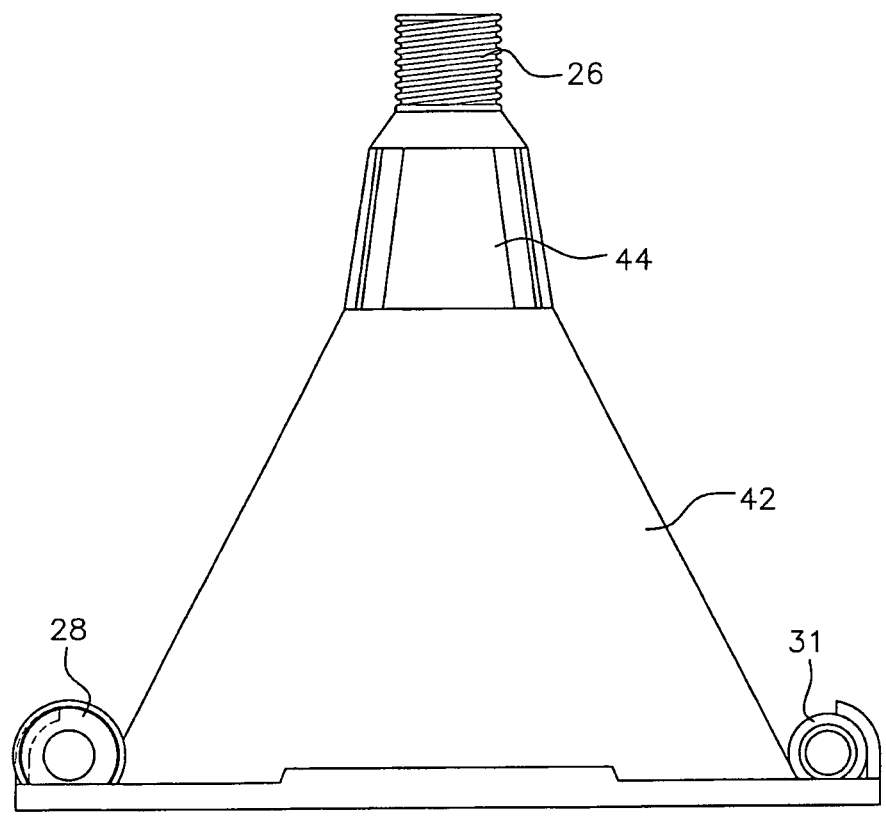
FIG. 4 is a top plan view of the oil collection assembly mounted in a vertical orientation.

As shown in the sectional view of FIG. 3, the funnel 12 includes a converging side wall 42 tapering down to an intermediate section 44 until reaching externally threaded outlet 26. The sectional view of the drain hose 14 includes the collected residual oil 40 located adjacent to the clip 30 at the bottom end 36 of the funnel.

By the corrugations in the drain hose 14, the drain hose is flexible so as to be bendable into a predetermined configuration. Oil collected in the funnel 12 is directed to outlet 26, so as to pass into the threaded opening 28 of the drain hose. The outlet end 30 of the drain hose is directed to a container for collection of oil.

The flexibility of the drain hose allows capture of portions of the drain hose under the clips 30 spaced about the periphery of three sides of the funnel 12. By hanging the funnel in a specific orientation with respect to the retention clips 30 and the positioning of the flexible hose engaged with the clips 30, gravity acts upon any residual oil retained within the drain hose to transition the residual oil to a lowermost connecting portion of the two legs of the U-shaped drain hose. Residual oil is thereby trapped so as to avoid leaking of the oil from the stored drain hose. The residual oil remains in place until the funnel and drain hose are interconnected again and the residual oil is directed from end 30 of the drain hose.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

We claim:

1. An oil collection assembly comprising
   a funnel,
   a drainage hose, said drainage hose being connectable to the funnel,
   retention clips for mounting the drainage hose on the funnel along a periphery of said funnel, with opposite ends of the drainage hose being laterally spaced apart and vertically oriented, and
   a hanging opening of the funnel for mounting the funnel on a vertical wall.

2. The oil collection assembly of claim 1, wherein the hanging opening is located at one end of the funnel.

3. The oil collection assembly of claim 2, wherein the hanging opening is located at a top end of the funnel.

4. The oil collection assembly of claim 1, wherein at least some of the retention clips are located on at least two sides of the funnel.

5. The oil collection assembly of claim 4, wherein one of the retention clips is located at a lower end of the funnel.

6. The oil collection assembly of claim 4, wherein the opposite ends of the drainage hose lie along opposite sides of the funnel.

7. The oil collection assembly of claim 6, wherein a curvature of a central portion of the drainage hose follows a curvature of a lower end of the funnel.

8. The oil collection assembly of claim 4, wherein the retention clips are located on three sides of the funnel.

9. The oil collection assembly of claim 8, wherein the hanging opening is located on a fourth side of the funnel.

10. The oil collection assembly of claim 1, wherein said funnel includes a threaded outlet and one of the opposite ends of the drainage hose is threaded for engaging the threaded outlet of the funnel.

11. The oil collection assembly of claim 1, wherein the drainage hose is held in a U-shape on the funnel.

12. The oil collection assembly of claim 11, wherein the opposite ends of the drainage hose open upwardly when the funnel is hung on a vertical wall by the hanging opening.

13. The oil collection assembly of claim 1, wherein a curvature of the retention clips is complementary to a curvature of said drainage hose.

14. The oil collection assembly of claim 1, wherein a side of the funnel opposite to a side of said funnel having the retention clips is flat.

15. An oil collection assembly comprising
    a funnel,
    a drainage hose, said drainage hose being connectable to the funnel,
    retention clips for mounting the drainage hose on the funnel with opposite ends of the drainage hose being vertically oriented,
    a hanging opening of the funnel for mounting the funnel on a vertical wall,
    at least some of the retention clips being located on at least two sides of the funnel,
    the opposite ends of the drainage hose lying along opposite sides of the funnel, and
    a curvature of a central portion of the drainage hose following a curvature of a lower end of the funnel.

16. The oil collection assembly of claim 15, wherein the drainage hose is held in a U-shape on the funnel.

17. The oil collection assembly of claim 16, wherein the opposite ends of the drainage hose open upwardly when the funnel is hung on a vertical wall by the hanging opening.

18. The oil collection assembly of claim 15, wherein a side of the funnel opposite to a side of said funnel having the retention clips is flat.

\* \* \* \* \*